Aug. 4, 1970  G. A. TINNERMANN  3,523,299
THREAD ENGAGING SHEET METAL FASTENER
Original Filed Sept. 20, 1965
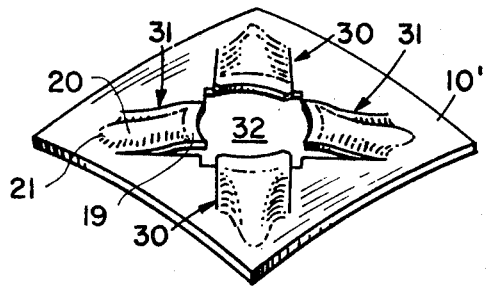
FIG. 1
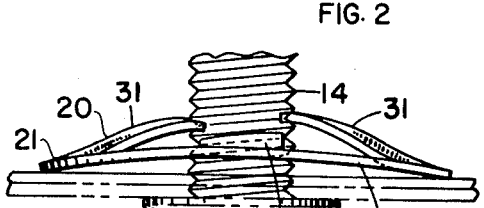
FIG. 2
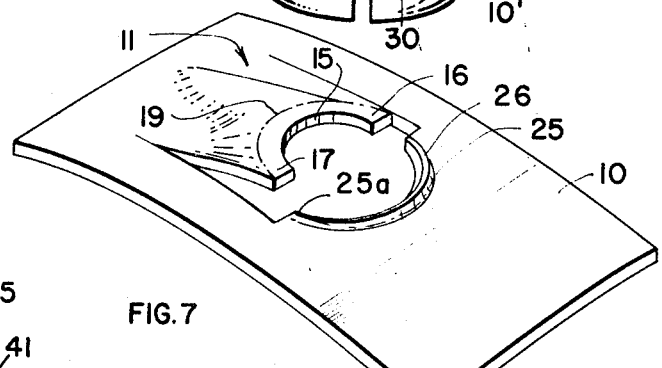
FIG. 7
FIG. 3
FIG. 4
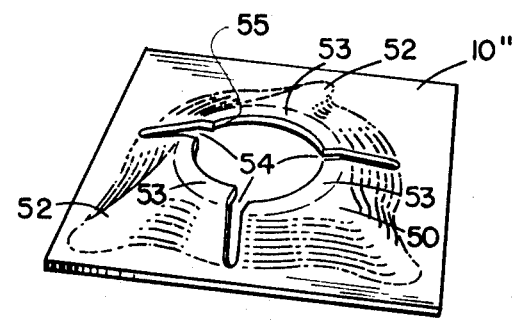
FIG. 5
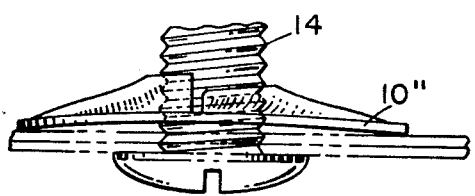
FIG. 6
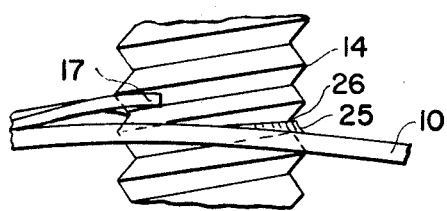
FIG. 8
INVENTOR
GEORGE A. TINNERMAN
BY
Arthur H. Van Horn
ATTORNEY

United States Patent Office 3,523,299
Patented Aug. 4, 1970

3,523,299
THREAD ENGAGING SHEET METAL FASTENER
George A. Tinnerman, 17864 Beach Road,
Lakewood, Ohio 44107
Original application Sept. 20, 1965, Ser. No. 489,467, now Patent No. 3,382,753. Divided and this application Oct. 10, 1967, Ser. No. 674,247
The portion of the term of the patent subsequent to Sept. 21, 1982, has been disclaimed
Int. Cl. F16b 17/00, 37/00
U.S. Cl. 85—36         1 Claim

ABSTRACT OF THE DISCLOSURE

A sheet metal nut has an aperture bounded by separated, arcuate edges arranged in a helical path with some of the edges formed on tongues struck out from the sheet metal and crowned to brace the tongues. One arcuate edge is axially spaced from the first arcuate edge and may be rigid with the nut body.

---

This application is a division of Ser. No. 489,467, filed Sept. 20, 1965, for Spring Steel Fasteners, now Pat. No. 3,382,753.

This invention relates to fasteners and more particularly to fasteners which may be fashioned from spring sheet material such as steel, and which is provided with an integral base and stud engaging and supporting portions to maintain proper alignment with and during assembly on a stud. The forms of the invention disclosed herein constitute improvements over my allowed copending application, Ser. No. 204,889, filed June 25, 1962, now Pat. No. 3,207,022.

In the past, spring steel fasteners constituted a base in the form of a flat or arched spring washer surrounding opposed prongs inclined upwardly from the base and toward one another with their free ends spaced apart for the passage of a stud shank between them to be gripped thereby to provide a complete fastener eliminating separate parts such as a lock washer or the like.

The present invention relates to improved types of such fasteners in which, by virtue of the unique related structural characteristics employed, the full strength of the base of the fastener, as well as the stud engaging portions, are utilized to effectively resist flattening of the prongs under higher thrust load and to insure against the possibility of misapplication to a stud, whether threaded or unthreaded.

By this invention, as illustrated and described herein, the application of the fastener to a threaded or unthreaded stud, the radial and circumferential thrusts applied against the stud are so distributed about the axis of the stud that alignment of the fastener with the stud is maintained even under extreme applications of torque. Thus the danger of damage to the fastener and/or to the stud during application is reduced to a minimum even under extreme tensile pull.

In the specific embodiments shown in this case, this result is attained by the formation of separate arcuate edges about an aperture for a threaded stud, with the edges bounding the aperture lying in a helical path to engage the threaded stud. One of the edges is on a tongue struck out of the sheet metal and inclined to the base with a crowned portion or rib extending back to the base to strengthen and rigidify the tongue.

FIGS. 1 and 2 are perspective and side views, in use, respectively, of one form of the invention.

FIGS. 3 and 4 are perspective and side views, in use, respectively, of a second form of the invention.

FIGS. 5 and 6 are perspective and side views, in use, respectively, of a third form of the invention.

FIGS. 7 and 8 are elevational and fragmentary side views, respectively, of a fourth form of the invention.

FIGS. 1 and 2 illustrate a form of the invention in which the arched rectangular base plate 10′ formed of spring steel sheet is provided with a plurality of pairs of opposed tongues 30 and 31, respectively, the said tongues having arcuate edges 15 on their ends 21 between the prongs 16 and 17. The pairs of tongues preferably are located so that their end portions 21 lie near and in a direction intersecting opposed corners of the base, respectively, and extend inwardly so their arcuate edges form a passage 32 therebetween for receiving the shank of a threaded stud 14. By providing pairs of opposed tongues with their respective edges 22 having bearing engagement with successive adjacent threads, such for instance, that the edges 15 of tongues 30 will have bearing engagement with the root of one thread, while the corresponding edges 15 of the tongues 31 have bearing engagement with the root of an adjacent thread, greater strength is imparted to the fastener in use and the full strength characteristics of the base are utilized.

Each tongue is outwardly crowned to form a rigidifying crown 19 and is formed with an outwardly rising longitudinal rib 20 which flares laterally to merge with the crown 19 and tapers rearwardly and extends to a terminal end 21 in the base 10′ at a point substantially beyond the line of juncture of the tongue and base, thus forming a rigidifying bridge extending substantially from an end of the base to the terminal open end of the tongue.

In FIGS. 3 and 4, the fastener illustrated utilizes opposed tongues 40 and 41 struck from the base plate 10, each having the prongs 16 and 17 and the arcuate edges 15 forming therebetween a passage 23 for receiving the shank of the threaded stud 14. In this form, there is also provided a pair of opposed inclined helical ribs 42 and 43, the helical top surfaces of which form arcuate edges and have bearing engagement with the root of a thread adjacent the next thread with which the edges 15 between prongs 16 and 17 have bearing engagement, so that the edges 15 engage the threads at least one turn from the engagement of the ribs 42, 43. This embodiment combines in a single fastener certain features disclosed in connection with FIGS. 1 and 2.

In FIGS. 5 and 6, still another modified form is illustrated in which three tongues 50, 51 and 52 are struck from the base plate 10′. The strength giving characteristics of the tongues 31 are incorporated here. However, the prongs have been eliminated to provide flat helical surfaces 53 with arcuate edges 55 along the free end of each tongue and defining therebetween a passage 23 for receiving the stud 14. It will be noted that the flat surfaces 53 are arranged in a succession and that the tongues are spaced apart circumferentially as at 54 and provide together circumferentially spaced helical surfaces 53 progressively inclining from the tongue 50, the tongue 51 and tongue 52. The peripheral edges of these surfaces have bearing engagement with the root of the stud thread.

FIGS. 7 and 8 illustrate a further modification of the invention in which the tongue 11 with its prongs 16 and 17, together with the rigidifying crown 19, are all substantially similar to the respective elements of FIGS. 3 and 4. Cooperating with the struck-up tongue and the base plate structure, a rib 25 is struck up from the base plate and has a top curved surface, helical in form, and extending from the surface of the base plate at 25a in an inclined direction equivalent to the pitch of the threads of the stud. The surface 26 of the rib has bearing engagement with the root of the thread, as do the prongs 16 and 17 opposed to the rib. In this way, proper alignment of the fastener with the stud is assured during the application of torque to the stud.

The foregoing description and accompanying drawings are considered as illustrative only of the principles of the invention and the spring steel fastener of the present invention is not to be regarded as limited by the above described embodiments.

What I claim is:

1. A spring steel nut comprising a base, said base having a pair of axially aligned tongues struck therefrom and severed from the base along their sides and integral with the base only at their ends opposite their free ends, said pair of tongues inclining outwardly from said base towards one another and terminating in adjacent spaced apart free ends, said free ends being inwardly recessed to form a passage therebetween for a stud to be engaged thereby, each of said tongues adjacent its free end being outwardly crowned to form a rigidifying crown surrounding each recess and extending completely across the free ends of the tongues, said crown flaring laterally thereof and merging with an outwardly rising longitudinal rib formed in each tongue and extending therefrom into said base substantially beyond the line of juncture of the base with each tongue to form a rigidifying bridge extending from said base to the terminal end of each tongue, and a pair of opposed helically rising ribs struck from the base and located between said tongues respectively to engage the threads of a threaded stud passing into said passage and to thereby apply bearing pressure against the stud, each of said ribs at its one end merging with the edge of said base and rising to a height above the base so that the entire rib from its lower end is above said base, said tongues engaging the threaded stud in the next succeeding turn of the threads of said stud, said ribs merging into said base being relatively rigid compared with said tongues to resist deflection upon the tightening of said stud and the deflection of said tongues under stress.

References Cited

UNITED STATES PATENTS

| | | | |
|---|---|---|---|
| 2,047,298 | 7/1936 | Tinnerman | 85—36 |
| 2,156,002 | 4/1939 | Tinnerman. | |
| 2,260,147 | 10/1941 | Lundberg et al. | 85—36 |
| 2,382,936 | 8/1945 | Bedford | 85—36 |
| 2,383,164 | 8/1945 | Ryder | 85—36 |
| 2,434,844 | 1/1948 | Flora. | |
| 2,561,473 | 7/1951 | Hughes | 85—36 |
| 3,207,022 | 9/1965 | Tinnerman | 85—36 |

MARION PARSONS, JR., Primary Examiner